United States Patent
Niu et al.

(10) Patent No.: US 10,785,803 B2
(45) Date of Patent: Sep. 22, 2020

(54) RACH PROCEDURE AND CONFIGURATION FOR UNLICENSED EMTC SYSTEM

(71) Applicant: Apple Inc., Cupertino, CA (US)

(72) Inventors: Huaning Niu, Milpitas, CA (US); Anthony Lee, San Diego, CA (US); Seau S. Lim, Swindon (GB); Wenting Chang, Beijing (CN); Salvatore Talarico, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/163,191

(22) Filed: Oct. 17, 2018

(65) Prior Publication Data
US 2019/0116618 A1    Apr. 18, 2019

Related U.S. Application Data

(60) Provisional application No. 62/588,065, filed on Nov. 17, 2017, provisional application No. 62/574,035, filed on Oct. 18, 2017.

(51) Int. Cl.
*H04W 4/00* (2018.01)
*H04W 74/08* (2009.01)
*H04B 7/06* (2006.01)
*H04W 72/04* (2009.01)
*H04W 72/14* (2009.01)

(52) U.S. Cl.
CPC ...... *H04W 74/0833* (2013.01); *H04B 7/0621* (2013.01); *H04W 72/042* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 2016/0165640 A1* | 6/2016 | Yang | H04W 4/70 370/336 |
| 2016/0270038 A1* | 9/2016 | Papasakellariou | H04L 1/1671 |
| 2016/0295609 A1* | 10/2016 | Vajapeyam | H04L 5/14 |
| 2017/0111780 A1* | 4/2017 | Rico Alvarino | H04L 45/28 |
| 2018/0132282 A1* | 5/2018 | Ly | H04W 8/245 |
| 2019/0159197 A1* | 5/2019 | Shrestha | H04W 72/0413 |

* cited by examiner

Primary Examiner — Gerald A Smarth
(74) Attorney, Agent, or Firm — Kowert, Hood, Munyon, Rankin & Goetzel, P.C.

(57) ABSTRACT

Embodiments of the present disclosure describe simplified RACH procedure and configuration for an eMTC system operating on unlicensed spectrum.

22 Claims, 8 Drawing Sheets

RACH PROCEDURE AND CONFIGURATION FOR UNLICENSED EMTC SYSTEM

RELATED APPLICATION

This application claims the benefit of priority under 35 U.S.C. § 119(e) of U.S. Provisional Patent Application Ser. No. 62/574,035, filed Oct. 18, 2017, entitled "RANDOM ACCESS CHANNEL (RACH) PROCEDURE AND CONFIGURATION FOR UNLICENSED ENHANCED MACHINE TYPE COMMUNICATION (EMTC) SYSTEM", and U.S. Provisional Patent Application Ser. No. 62/588,065, filed Nov. 17, 2017, entitled "RACH PROCEDURE AND CONFIGURATION FOR UNLICENSED EMTC SYSTEM," each of which is incorporated herein by reference in its entirety.

FIELD

Embodiments of the present disclosure generally relate to the field of networks, and more particularly, to apparatuses, systems, and methods for Random Access Channel (RACH) procedures and configuration for unlicensed enhanced Machine-Type Communication (eMTC) systems.

BACKGROUND

This disclosure is related to Long Term Evolution (LTE) operation in unlicensed spectrum in MulteFire, specifically the Internet of Things (IoT) operating in unlicensed spectrum.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," and "A/B" mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
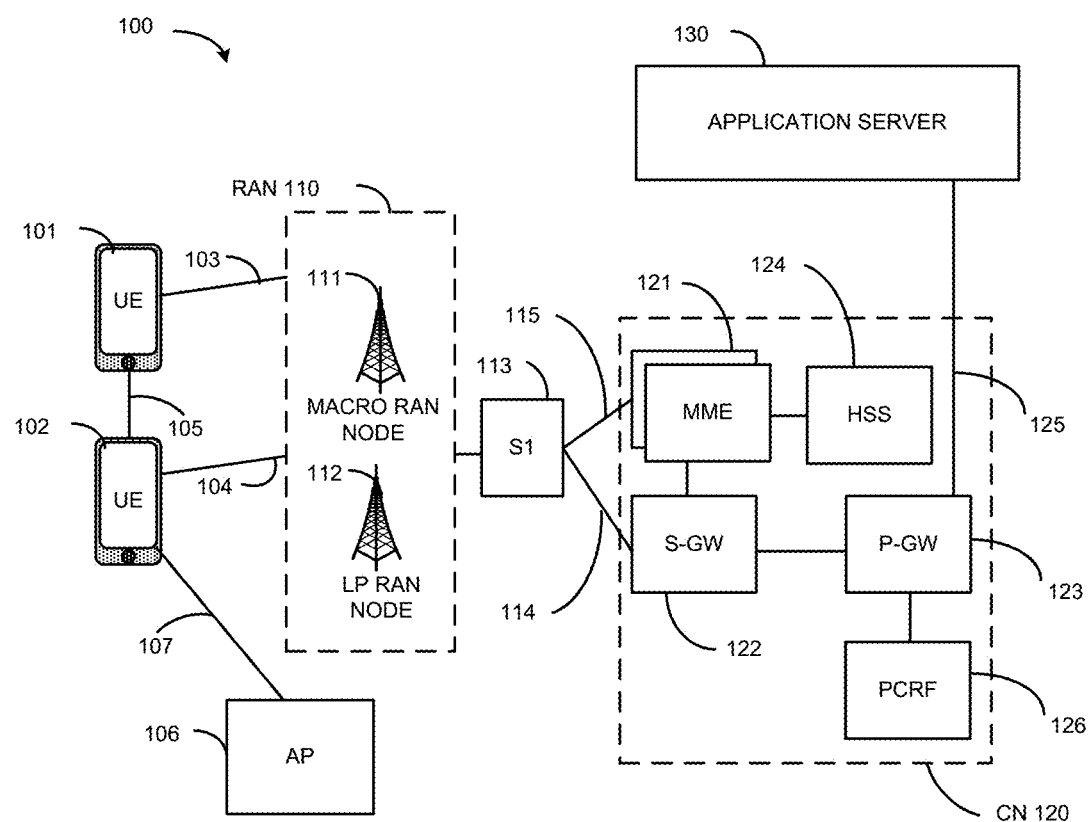
FIG. 1 depicts an architecture of a system of a network in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110 the RAN 110 may be, for example, an Evolved Universal Mobile Telecommunications System (E-UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
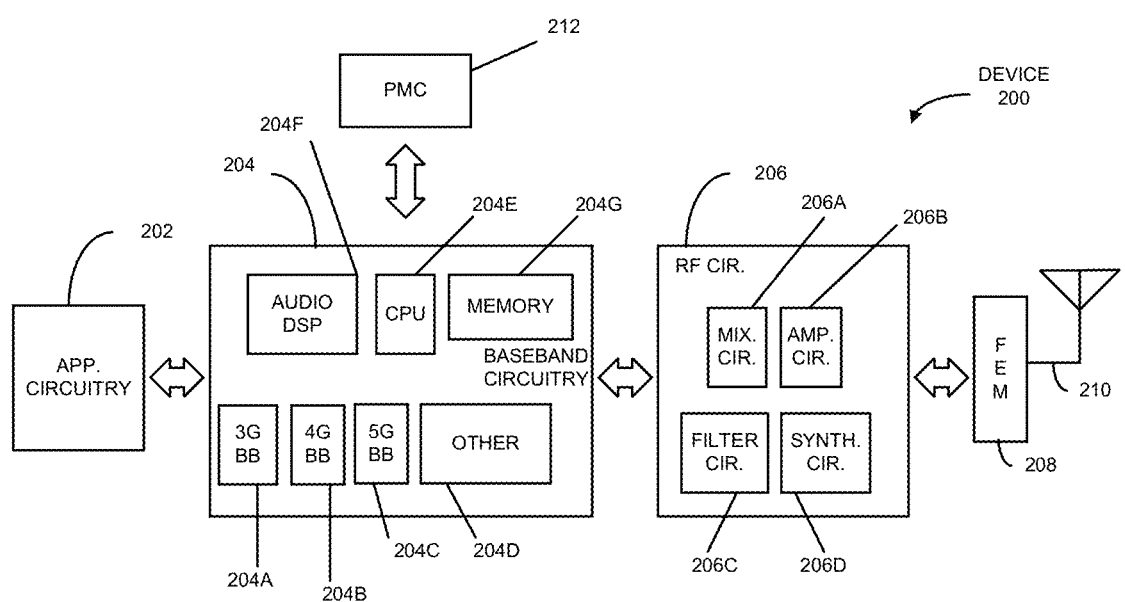
FIG. 2 depicts example components of a device in accordance with some embodiments

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in sonic embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature down-conversion and up-conversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct down-conversion and direct up-conversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state. To receive data, a transition back to RRC_Connected state will be implemented.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
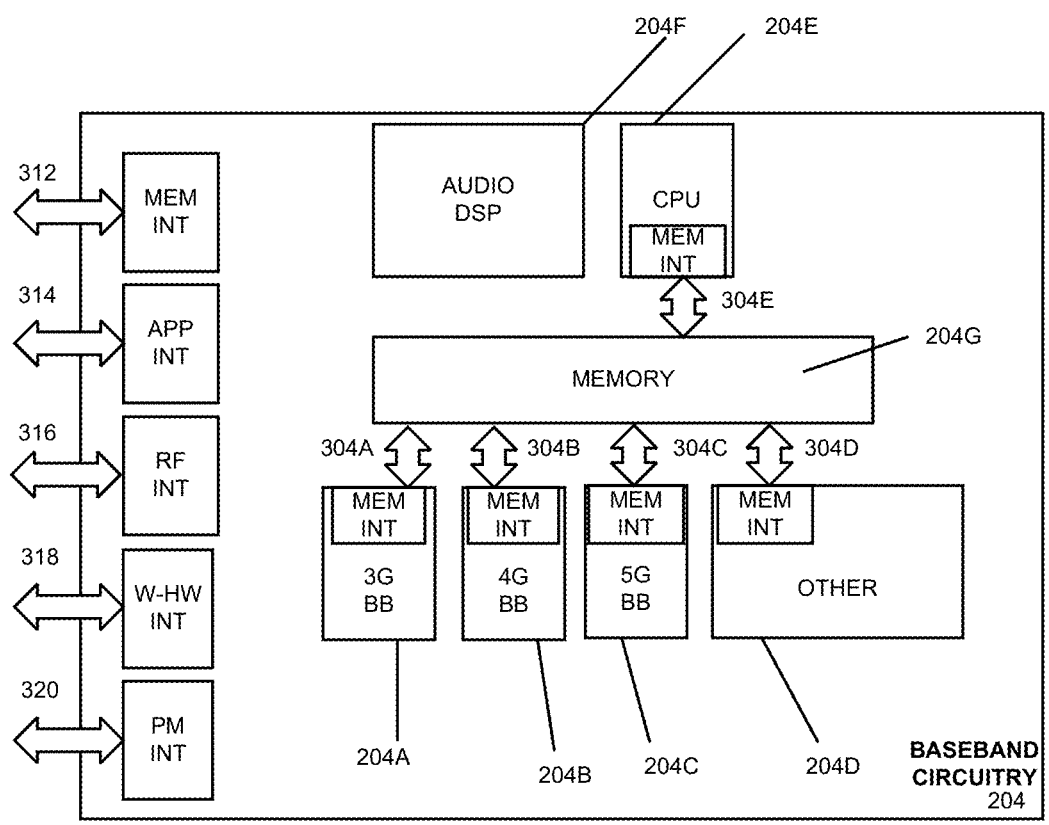
FIG. 3 depicts example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
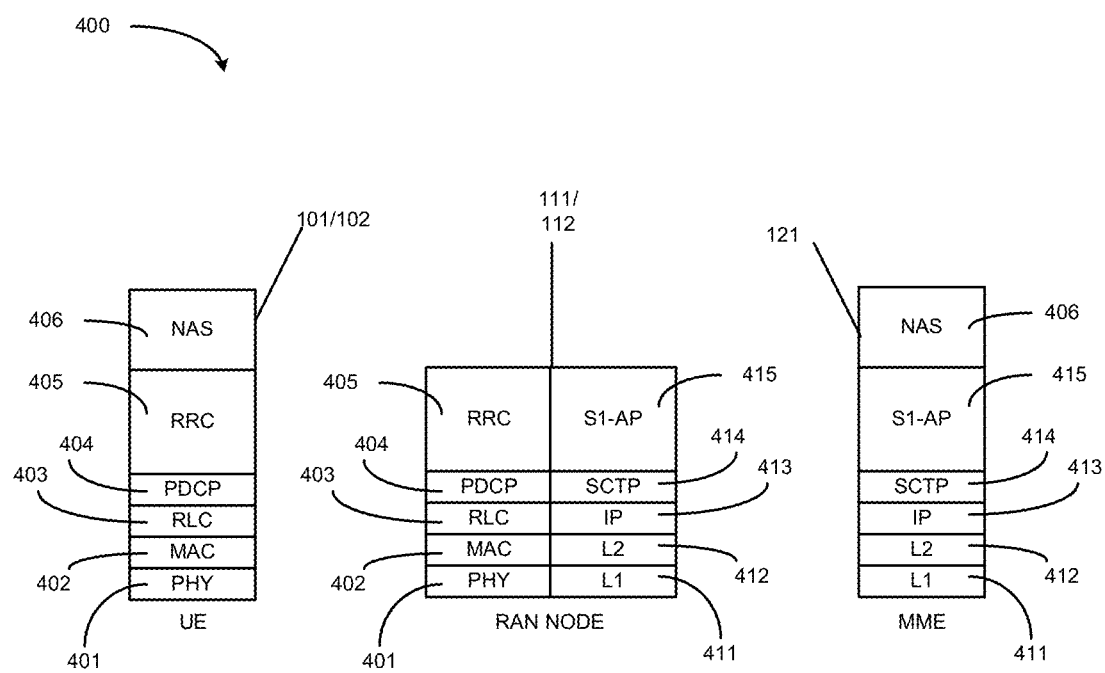
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
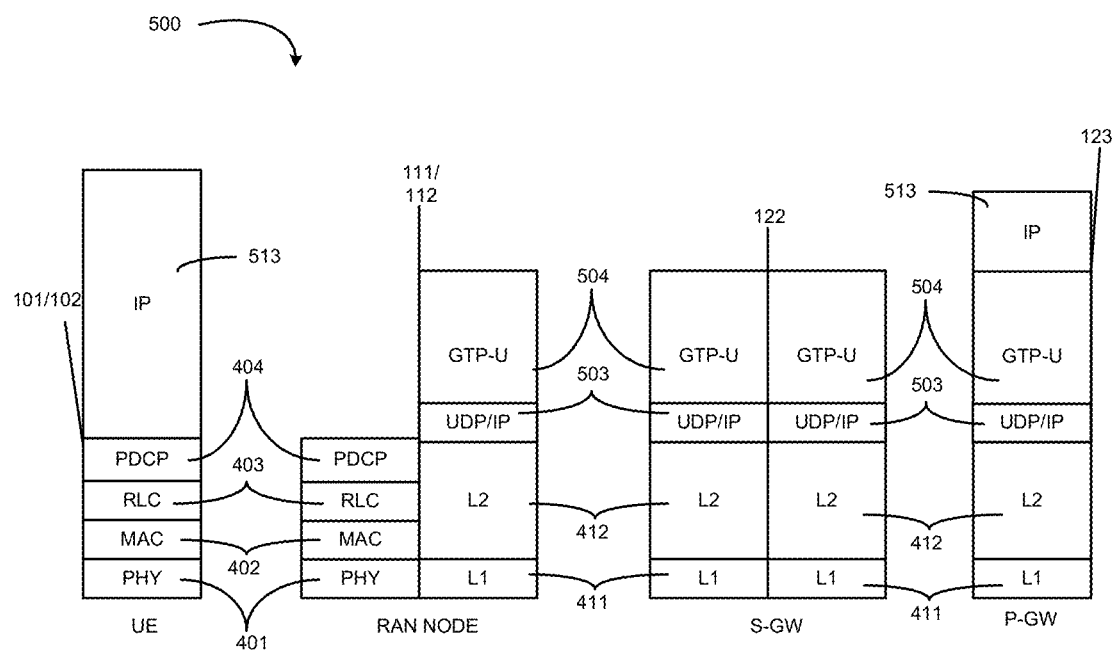
FIG. 5 is an illustration of a user plane protocol stack in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
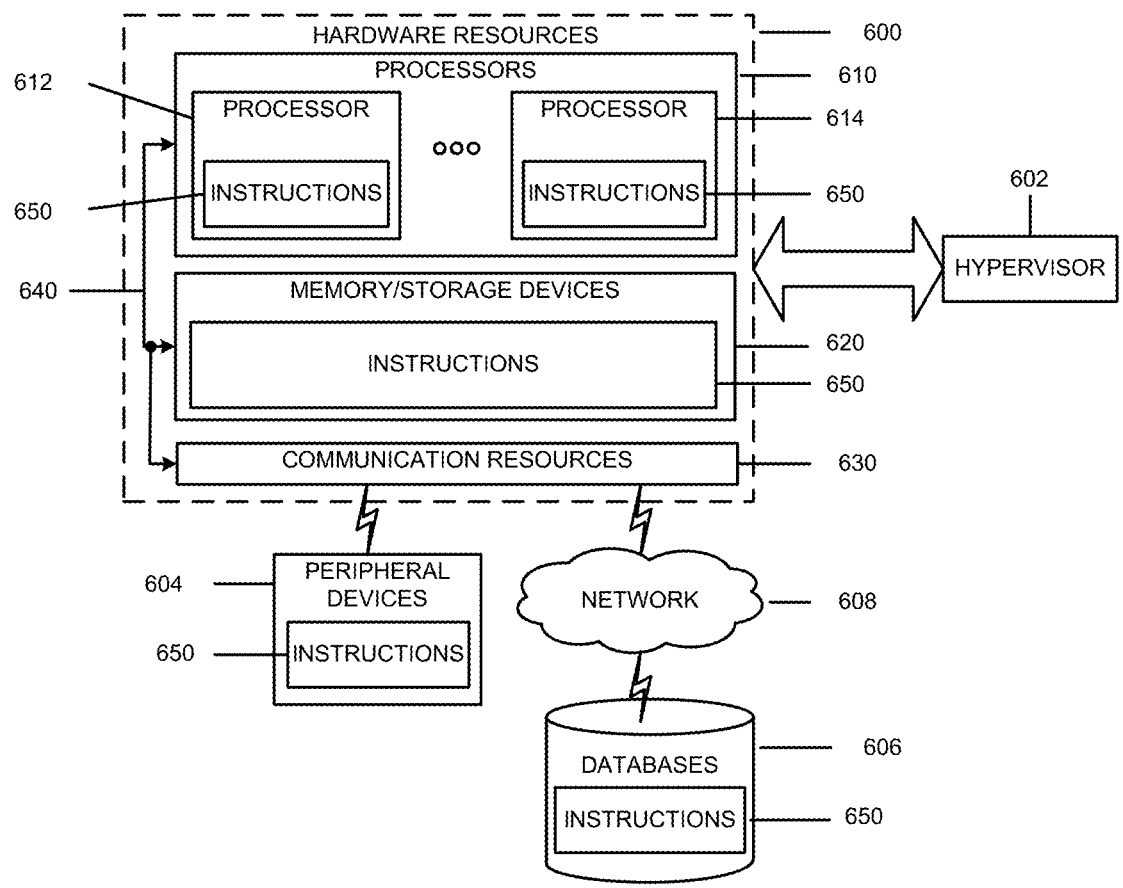
FIG. 6 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600.

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof.

The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 800 from any combination of the peripheral devices 604 or the databases 606. Accordingly, the memory of processors 610, the memory/storage devices 620, the peripheral devices 604, and the databases 606 are examples of computer-readable and machine-readable media.

Internet of Things (IoT)

The IoT is envisioned as a significantly important technology component, that has huge potential and may change our daily life entirely by enabling connectivity between a large number of devices. The IoT has wide applications in various scenarios, including smart cities, smart environment, smart agriculture, and smart health systems.

3GPP has standardized two designs to support IoT services—enhanced Machine Type Communication (eMTC) and NarrowBand IoT (NB-IoT). As eMTC and NB-IoT UEs will be deployed in great numbers, lowering the cost of these UEs is a key enabler for implementation of the IoT. Also, low power consumption is desirable to extend the life time of the battery. In addition, there are substantial opportunities for these devices to be deployed deep inside buildings, which would require coverage enhancement in comparison to the defined Long Term Evolution (LTE) cell coverage footprint. In summary, eMTC, and NB-IoT techniques are designed to ensure that the UEs have low cost, low power consumption, and enhanced coverage.

LTE Operation in Unlicensed Spectrum

Both Rel-13 eMTC and NB-IoT operates in licensed spectrum. On the other hand, the scarcity of licensed spectrum in a low frequency band results in a deficit in the data rate boost. Thus, there are emerging interests in the operation of LTE systems in unlicensed spectrum.

Potential LTE operation in unlicensed spectrum includes, but is not limited to, Carrier Aggregation based on LAA/eLAA systems, LTE operation in the unlicensed spectrum via dual connectivity (DC), and the standalone LTE system in the unlicensed spectrum, where LTE-based technology solely operates in unlicensed spectrum without requiring an "anchor" in licensed spectrum—called MulteFire.

To extend the benefits of LTE IoT designs into unlicensed spectrum, MulteFire L1 is expected to specify the design for Unlicensed-IoT (U-IoT). The current description falls in the scope of the U-IoT systems, with focus on the eMTC based U-IoT design. Note that similar approaches can be used to an NB-IoT based U-IoT design as well.

Regulations in Unlicensed Spectrum

The unlicensed frequency band of interest in this disclosure is the 2.4 GHz band. For global availability, the design may abide by the regulations in different regions, e.g. the regulations established by the FCC in US and the regulations established by the ETSI in Europe. Based on these regulations, frequency hopping is more appropriate than other forms of modulation due to more relaxed power spectrum density (PSD) limitations and co-existence with other unlicensed band technologies such as Bluetooth and WiFi. Specifically, frequency hopping has no PSD limit while other wide band modulations have a PSD limit of 10 dBm/MHz in regulations established by the ETSI. The low PSD limit would result in limited coverage. Thus, this disclosure focuses on the U-IoT with frequency hopping.

RACH Procedure and Configuration for eMTC-U

In the unlicensed eMTC-U system, there is a limited downlink and uplink subframe configuration, and the target MCL (Maximum Coupling Loss) is different, so the RACH procedure can be simplified, e.g. reducing the coverage enhancement level. To support the simplified RACH procedure, the corresponding parameters need to be configured.

This disclosure focuses on the design of the physical (PHY) layer and the medium access control (MAC) layer of the random access channel (RACH) procedure. Here, the eMTC-U system is characterized by frequency hopping where the hopping sequence depends on carrier sensing procedure success.

The advantage lies in the fact that the proposed solutions allow a simple RACH procedure for eMTC-U systems.

Figure 7:
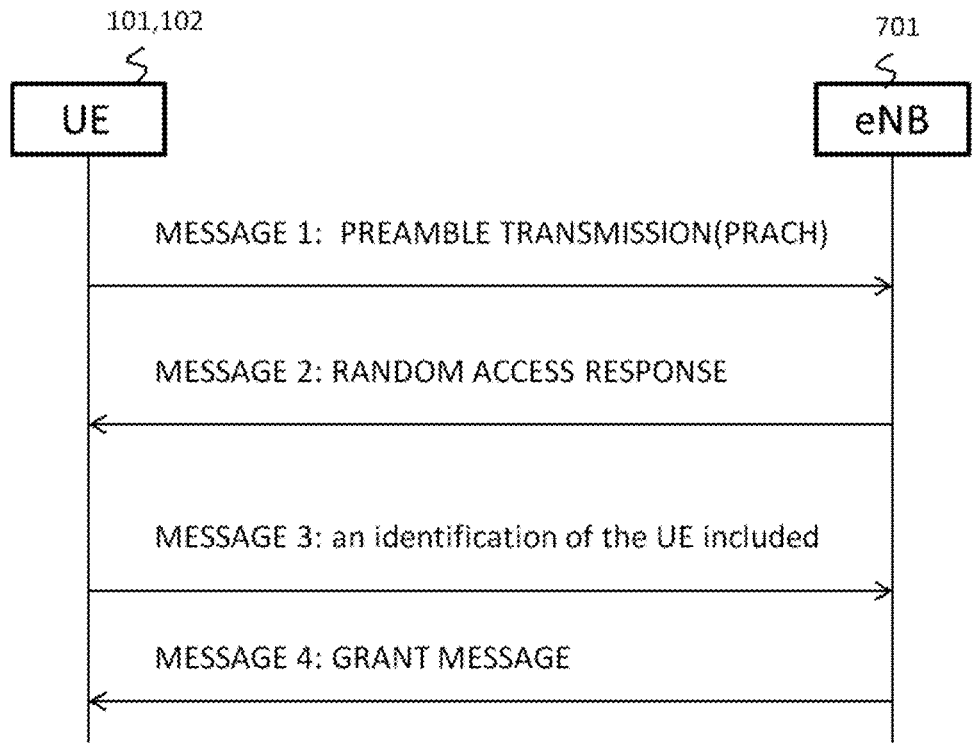
FIG. 7 depicts stages of a RACH procedure for obtaining initial access according to some embodiments.
Figure 8:
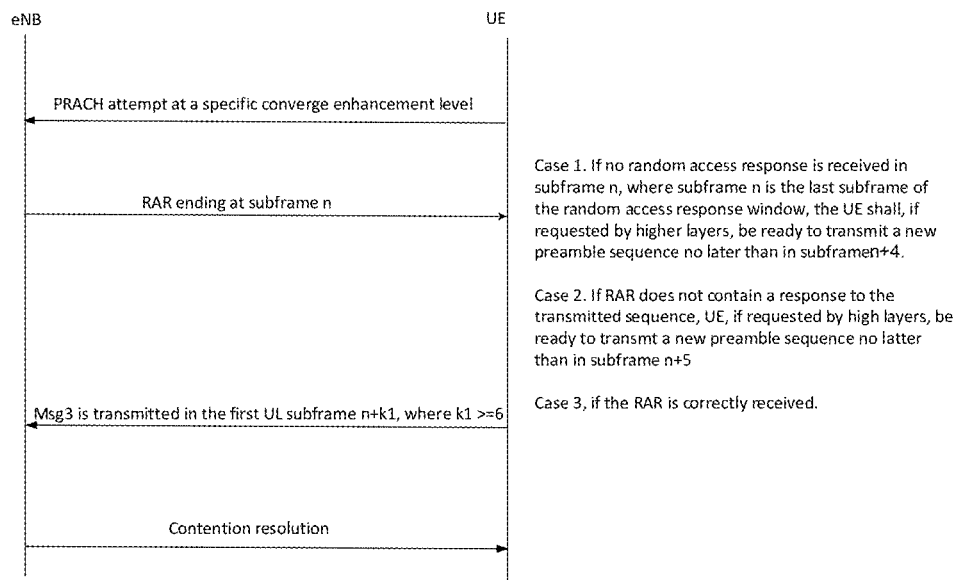
FIG. 8 depicts a Physical Random Access Channel (PRACH) attempt at a specific coverage enhancement level.

The legacy L1 random access procedure is illustrated in FIGS. 7 and 8.

To initially access the network, the UE performs a random access channel (RACH) procedure.

FIG. 7 illustrates the stages of a RACH procedure for obtaining initial access according to some embodiments. The RACH procedure begins when the UE 101, 102, after acquiring synchronization and system information, transmits a random access preamble on the physical random access channel (PRACH) to the eNB 701, referred to as message 1. The preamble transmission indicates to the eNB the presence of a UE performing a random access procedure and also allows the eNB to estimate the transmission delay between the UE and eNB and to adjust the uplink timing. The eNB responds with a random access response (RAR) over the PDCCH, referred to as message 2, using a Random Access-Radio Network Temporary Identity (RA-RNTI) to address the UE. Message 2 also includes a timing advance command. The UE expects to receive the RAR within a time window, of which the start and end are configured by the eNB via a system information block (SIB) for LTE. The RA-RNTI may be derived from the specific time-frequency resources that the UE selects for transmitting message 1. The UE then transmits an L2/L3 message with adjusted timing, referred to as message 3, to the eNB using a Physical Uplink Shared Channel (PUSCH) resource assigned to the UE by message 2. Message 3 includes a UE identification as well as other content such as an radio resource control (RRC) connection request. The eNB then transmits a grant message, referred to as message 4, to the UE that resolves any contention due to multiple UEs performing a random access procedure using the same preamble and receiving the same random access response (RAR) from the eNB. If the random access procedure is successful, the UE is granted uplink resources.

FIG. 8 illustrates a Physical Random Access Channel (PRACH) attempt at a specific coverage enhancement level. First, a PRACH attempt is sent at a specific coverage enhancement level. Then the RAR ends at subframe n. Here are three situations. For case 1, if no random access response is received in subframe n, where subframe n is the last subframe of the random access response window, the UE may, if requested by higher layers, be ready to transmit a new preamble sequence no later than in subframe n+4. For case 2, if the RAR does not contain a response to the transmitted sequence, the UE may, if requested by higher layers, be ready to transmit a new preamble sequence no later than in subframe n+5. For case 3, if the RAR is correctly received, message 3 is transmitted in the first Up Link (UL) subframe n+k1, where k1>=6.

In the above procedures, a UE may make more than one attempt per coverage enhancement level. If it correctly receives the RAR, then the Coverage Enhancement (CE) level of the UE is determined. Otherwise, after maximum attempts, the UE will try the next CE level of RACH procedure.

Coverage Enhancement (CE) Level

In one embodiment of this disclosure, one level coverage enhancement (e.g. Mode A) is supported for eMTC-U system.

The UE transmits the RACH sequence within the RACH transmission occasion, and wait for the RAR.

Similarly, as a legacy, the three cases in FIG. 8 will have occurred, and the UE re-transmits the preamble accordingly.

In one embodiment, one level of a common search space (CSS) Physical Downlink Control Channel (PDCCH) configuration is used, and a Physical Uplink Control Channel (PUCCH) or a Physical Uplink Shared Channel (PUSCH) may be configured. The UE search space design may reuse the eMTC, that is the triplet {AL,RL,# BDs} (Aggregation level+Repetition level+# of blind decoding attempts). The UE search space timing is reset every dwell time.

In one embodiment of this disclosure, two levels of coverage enhancement are supported.

CE level 0 and CE level 1.

The PRACH length of two CE levels are configured in units of Orthogonal Frequency Division Multiplexing (OFDM) symbols, e.g. 7 OFDM symbols for CE level 0 and 14 OFDM symbols for CE level 1.

A different level RACH can be orthogonal by CDM (code-division multiplexing)/TDM (time-division multiplexing)/FDM (frequency-division multiplexing)

A procedure similar to the legacy L1 procedure may be used.

In one embodiment of this disclosure, a two level CSS PDCCH configuration is used and PUCCH/PUSCH may be configured.

Random Access Response (RAR) Grant

The RAR grant of legacy eMTC (Up Link (UL) grant in RAR) is illustrated in the following table:

| DCI contents | |
| --- | --- |
| Msg3 PUSCH narrowband index | $N_{NB}^{index}$ |
| Msg3 PUSCH Resource allocation | 4 |
| Number of Repetitions for Msg3 PUSCH | 2 |
| MCS | 3 |

| DCI contents | |
| --- | --- |
| TPC | 3 |
| CSI request | 1 |
| UL delay | 1 |
| Msg3/4 MPDCCH narrowband index | 2 |
| Zero padding | $4-N_{NB}^{index}$ |
| Total Nr-bits | 20 |

In one embodiment of this disclosure, the legacy RAR grant is reused, with the following exception:
"Msg3 PUSCH narrowband index" bit field removed;
"Msg3/4 MPDCCH narrowband index" bit field removed;
Msg3 PUSCH Resource allocation may be extended to 5 bits;
"Uplink (UL) delay" bit field removed.

In one embodiment of this disclosure, the Channel State Information (CSI) request may be reused and a polling bit may be added in the CSI request. This polling bit is used to indicate whether the reported channel quality indication (CQI), preceding matrix indicator (PMI) or rank indication (RI) is wideband or corresponding to the sub-band at which the down link control information (DCI) is transmitted. Alternatively, there is no need for the extra polling bit, and the reported CQI/PMI/RI corresponds to either the frequency on which DCI is transmitted or to the wideband CQI by default. The particular UE implementation may determine whether the CQI/PMI/RI is measured only on the anchor channel and the RAR channel. In another embodiment according to this disclosure, the CSI request bit is not needed and the eNB itself performs the channel estimation based on the RACH according to the channel reciprocity.

Random Access Response (RAR) Window

In LTE, the UE monitors the PDCCH for Random Access Response(s) identified by the RA-RNTI during a specific window. If no RAR is received within the RAR window, or if none of the received RARs contain a Random Access Preamble identifier that corresponds to the transmitted Random Access Preamble, the UE determines that no Random Access Response has been received and proceeds in selecting a preamble selection, and transmitting.

Start of the RAR Window

In one embodiment, the RAR window starts at a subframe, which is at least three subframes after the last subframe that contains a preamble transmission, as defined in TS 36.211/36.321, and the RAR window length is ra-ResponseWindowSize subframes. This follows the legacy LTE definition.

Figure 9:
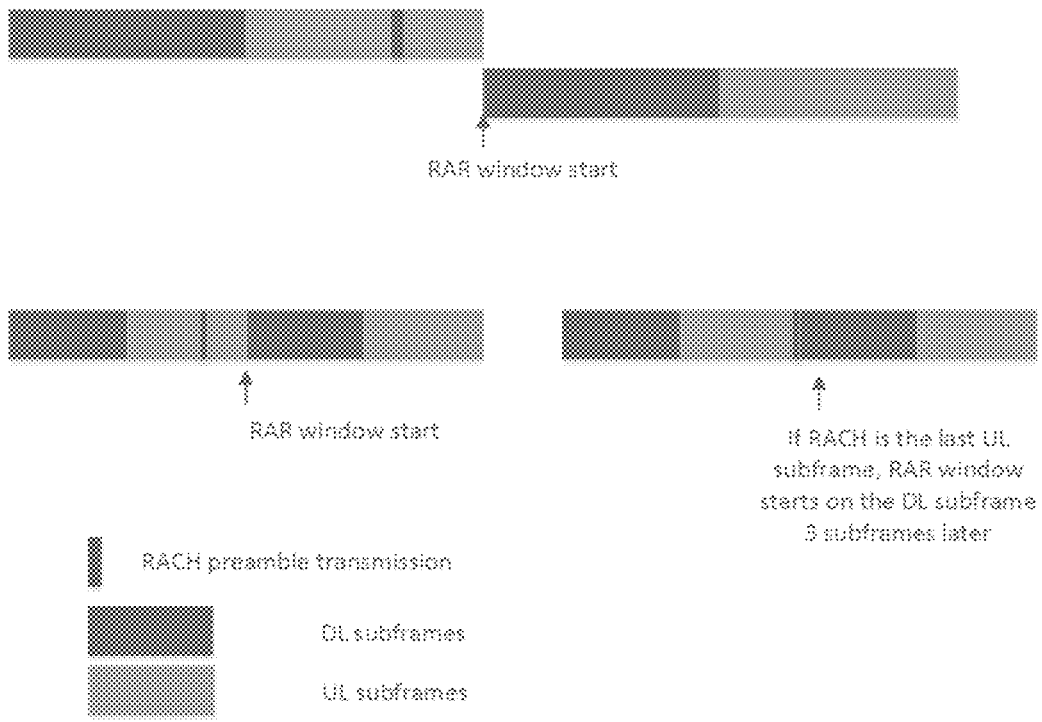
FIG. 9 depicts a few examples of Random Access Response (RAR) window.

In another embodiment, the RAR window starts at the start of the Downlink (DL) transmission with at least three subframes after the preamble transmission. A few examples are shown in FIG. 9. On the top of FIG. 9 the RAR window starts at the start of the subsequent DL period and the PRACH configuration is transmitted at least three subframes before the end of the Uplink(UL) dwell.

RAR Window Size ra-ResponseWindowSize for eMTC-U should take into account the following:
the number of the Machine Type Communication Physical Downlink Control Channel (MPDCCH) repetitions
Listen Before Talk (LBT): for DL subframes at the beginning of the dwell time, maximum clear channel assessment (CCA) window size is three milliseconds. The system information block (SIB) signals the maximum size of LBT CCA window on the anchor.

In some embodiments, the PDSCH transmission is included in the RAR window size. In another embodiment, the RAR window size does not include the PDSCH transmission.

Each data dwell has a length of 75 milleseconds. If LBT fails at the beginning of the dwell time, the next transmission opportunity is 80 milliseconds later.

In one embodiment, if the RAR window starts three subframes after RACH transmission, in a manner similar to that defined for the LTE, then the RAR window length can then be configured using absolute subframe time indexes in a manner similar as in legacy LTE, for example:

ra-ResponseWindowSize-eMTC-U-MF ENUMERATED {sf20, sf60, sf100, sf140, sf180, sf220}

This configuration allows a maximum of three chances for LBT success for a DL transmission.

In one embodiment, if the RAR window starts at the DL transmission with at least three subframes after the RACH transmission, And if the PDSCH is not part of the RAR window, then the RAR window length may be configured as the maximum LBT size+mPDCCH length+multiple dwell times. For example:

ra-ResponseWindowSize-eMTC-U-MF ENUMERATED {sf11, sf91, sf171}

Alternatively, if the PDSCH is part of the RAR window, then the RAR window length can be configured as the maximum LBT size+DL transmission time depending on DL/UL configuration+multiple dwell times. For example, if the DL/UL configuration signaled in the SIB on anchor has a 30DL subframe and a 45UL subframe:

ra-ResponseWindowSize-eMTC-U-MF ENUMERATED {sf30, sf110, sf190}.

Thus, the RAR window size is variable depending on configuration.

This configuration allow maximum of three chances for LBT success for a DL transmission.

Random Access-Radio Network Temporary Identity (RA-RNTI) Calculation

Due to a longer RAR window to accommodate multiple data dwell times, the RA-RNTI calculation equation needs a corresponding modification to avoid wrap around ambiguity. The exact equation depends on the RACH preamble physical channel design.

For example, if RACH preamble is one subframe, one PRB Zadoff-Chu sequence, the RA-RNTI calculation can reuse eMTC, as shown in the following equation:

$$RA\text{-}RNTI=1+t\_id+10*f\_id+60*(SFN\_id \bmod(W\max/10)).$$

Where t_id is the subframe index of the RACH preamble transmission (where 0<=t_id<10), f_id is the frequency index of the RACH preamble transmission, with 0<=f_id<6, Wmax is the maximum RAR window, and SFN_id is the index of the radio frame carrying the RACH preamble transmission.

In another example, if RACH preamble is one slot, one PRB Zadoff-Chu sequence, the RA-RNTI calculation is shown in the following equation:

$$RA\text{-}RNTI=1+t\_id+20*f\_id+120*(SFN\_id \bmod (W\max/10)).$$

Where t_id is the slot index of the RACH preamble transmission (where 0<=t_id<20), f_id is the frequency index of the RACH preamble transmission, with 0<=f_id<6, Wmax is the maximum RAR window, and SFN_id is the index of the radio frame carrying the RACH preamble transmission.

In another example, if RACH preamble is one subframe, six PRB Zadoff-Chu sequence, (reuse legacy RACH preamble), the RA-RNTI calculation is shown in the following equation:

$$RA\text{-}RNTI=1+t\_id+10*(SFN\_id \bmod(W\max/10)).$$

Where t_id is the sf index of the RACH preamble transmission 0<=t_id<10). Wmax is the maximum RAR window, and SFN_id is the index of the radio frame carrying the RACH preamble transmission.

EXAMPLES

Example 1 is an apparatus an enhanced Machine-Type Communication (eMTC) user equipment (UE) configured to operate in an unlicensed spectrum, the apparatus comprising: a processor configured to: encode a random access channel (RACH) preamble to be included in physical random access channel (PRACH) data; decode a random access response (RAR) from a base station; encode a message that includes an identification of the UE; and, decode a grant of uplink resources from the base station, wherein, the RACH preamble is configured for one level of coverage enhancement (CE); and an RF interface to receive the RACH preamble and the message that includes the identification of the UE.

In Example 2, the subject matter of Example 1 or any of the Examples described herein may further include wherein the processor is to process one level of a common search space (CSS) Physical Downlink Control Channel (PDCCH) to determine a Downlink Control Information (DCI) corresponding to the RAR message and to configure one level of Physical Uplink Control Channel (PDCCH) or Physical Uplink Shared Channel (PUSCH).

In Example 3, the subject matter of Example 1 or any of the Examples described herein may further include wherein one level of the CSS PDCCH configuration includes one level of Aggregation level, one level of Repetition level and one level of blind decoding attempt, and the UE search space timing is reset every dwell time.

In Example 4, the subject matter of Example 1 or any of the Examples described herein may further include wherein the RACH preamble is configured for two levels of CE: CE level 0 and CE level 1, and the PRACH length of the two CE levels are configured in units of Orthogonal Frequency-Division Multiplexing (OFDM) symbols, and different level RACHs are orthogonal by code-division multiplexing (CDM) or time-division multiplexing (TDM) or frequency-division multiplexing (FDM).

In Example 5, the subject matter of Example 1 or any of the Examples described herein may further include wherein the processor is to process two levels of CSS PDCCH to determine Downlink Control Information (DCI) corresponding to the RAR message, and to configure two levels of PUCCH or PUSCH.

In Example 6, the subject matter of Example 1 or any of the Examples described herein may further include wherein a legacy RAR grant is reused with one or more following exceptions: Msg3 PUSCH narrowband index bit field is removed; Msg3/4 MPDCCH narrowband index bit field is removed.

In Example 7, the subject matter of Example 1 or any of the Examples described herein may further include wherein Uplink (UL) delay bit field is removed.

In Example 8, the subject matter of Example 1 or any of the Examples described herein may further include wherein a Channel State Information (CSI) request is reinterpreted to indicate whether the CSI is wideband or performed over the frequency band over which a DCI is transmitted.

In Example 9, the subject matter of Example 1 or any of the Examples described herein may further include wherein a RAR window starts at the start of the subsequent downlink (DL) duration and the PRACH configuration is at least three subframes before the uplink (UL) duration ending time.

In Example 10, the subject matter of Example 1 or any of the Examples described herein may further include wherein a RAR window starts at a subframe which is at least three subframes after the last subframe that contains a preamble transmission, with the RAR window length being ra-ResponseWindowSize subframes.

In Example 11, the subject matter of Example 1 or any of the Examples described herein may further include wherein if an RAR window starts from at least three subframes after the RACH preamble transmission, the RAR window length being configured using an absolute subframe time index In Example 12, the subject matter of Example 1 or any of the Examples described herein may further include wherein if the RACH preamble is one subframe, and six PRB Zadoff-Chu sequences, a Random Access-Radio Network Temporary Identity (RA-RNTI) is calculated by the equation "RA-RNTI=1+t_id+10*(SFN_id mod (Wmax/10))", where t_id is the subframe index of the RACH preamble transmission (where 0<=t_id<10), Wmax is the maximum RAR window, and SFN_id is the index of the radio frame carrying the RACH preamble transmission.

In Example 13, the subject matter of Example 1 or any of the Examples described herein may further include wherein a value for ra-ResponseWindowSize is calculated based on the number of Machine Type Communication Physical Downlink Control Channel (MPDCCH) repetitions, clear channel assessment (CCA) window, and whether a Physical Downlink Shared Channel (PDSCH) is included in RAR window size.

In Example 14, the subject matter of Example 1 or any of the Examples described herein may further include wherein if Physical Downlink Shared Channel (PDSCH) is not part of an RAR window, then RAR window length is determined as the sum of maximum LBT size, mPDCCH length, and multiple dwell time; or if PDSCH is part of the RAR window, then RAR window length is determined as the sum of maximum LBT size, DL transmission time depending on Down Link/Up Link (DL/UL) configuration, and multiple dwell time.

In Example 15, the subject matter of Example 1 or any of the Examples described herein may further include wherein if the RACH preamble is one subframe, and one PRB Zadoff-Chu sequence, and RA-RNTI is calculated by the equation "RA-RNTI=1+t_id+10*f_id+60*(SFN_id mod (Wmax/10))", where t_id is the subframe index of the RACH preamble transmission (where 0<=t_id<10), f_id is the frequency index of the RACH preamble transmission, with 0<=f_id<6, Wmax is the maximum RAR window, and SFN_id is the index of the radio frame carrying the RACH preamble transmission; and if the RACH preamble is one slot, and one PRB Zadoff-Chu sequence, the RA-RNTI is calculated by the equation "RA-RNTI=1+t_id+20*f_id+120*(SFN_id mod(Wmax/10))", where t_id is the slot index of the RACH preamble transmission (where 0<=t_id<20), f_id is the frequency index of the RACH preamble transmission, with 0<=f_id<6, Wmax is the maximum RAR window, and SFN_id is the index of the radio frame carrying the RACH preamble transmission.

Example 16 is an apparatus of a base station operable to communicate with an enhanced Machine-Type Communication (eMTC) user equipment (UE) in an unlicensed spectrum, comprising: a processor configured to: decode a random access channel (RACH) preamble to he included in physical random access channel (PRACH) data from the UE, and encode a random access response (RAR) in response to the RACH preamble, wherein the RACH preamble is configured for one level of coverage enhancement (CE); and an RF interface to receive the RAR.

In Example 17, the subject matter of Example 16 or any of the Examples described herein may further include wherein a legacy RAR grant is reused with one or more following exceptions: "Msg3 PUSCH narrowband index" bit field is removed; "Msg3/4 MPDCCH narrowband index" bit field is removed.

In Example 18, the subject matter of Example 17 or any of the Examples described herein may further include wherein "Up Link (UL) delay" bit field is removed.

In Example 19, the subject matter of Example 17 or any of the Examples described herein may further include wherein Msg3 PUSCH Resource allocation is extended to 5 bits.

In Example 20, the subject matter of Example 17 or any of the Examples described herein may further include wherein, a Channel State Information (CSI) request is reinterpreted to indicate whether the CSI is wideband or performed over the frequency band over which a DCI is transmitted.

In Example 21, the subject matter of Example 17 or any of the Examples described herein may further include wherein, a Channel State Information (CSI) request is reused, the CSI including one or more of a channel quality indication (CQI), a preceding matrix indication (PMI) or a rank indication (RI), and a polling bit is added in the CSI request to indicate whether the CQI, PMI or RI is wideband or corresponds to the frequency at which DCI is transmitted.

In Example 22, the subject matter of Example 17 or any of the Examples described herein may further include wherein a Channel State Information (CSI) request bit is not added, and the base station performs the channel estimation based on the RACH according to channel reciprocity.

Example 23 may include one or more non-transitory computer-readable media comprising instructions to cause an electronic device, upon execution of the instructions by one or more processors of the electronic device, to perform one or more elements of a method described in or related to any of examples 1-19, or any other method or process described herein.

Example 24 may include an apparatus comprising logic, modules, or circuitry to perform one or more elements of a method described in or related to any of examples 1-19, or any other method or process described herein.

Example 25 may include a method, technique, or process as described in or related to any of examples 1-19, or portions or parts thereof.

Example 26 may include an apparatus comprising: one or more processors and one or more computer readable media comprising instructions that, when executed by the one or more processors, cause the one or more processors to perform the method, techniques, or process as described in or related to any of examples 1-19, or portions thereof.

Example 27 may include a signal as described in or related to any of examples 1-19, or portions or parts thereof.

Example 28 may include a signal in a wireless network as shown and described herein.

Example 29 may include a method of communicating in a wireless network as shown and described herein.

Example 30 may include a system for providing wireless communication as shown and described herein.

Example 31 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. An apparatus of an enhanced Machine-Type Communication (eMTC) user equipment (UE) configured to operate in an unlicensed spectrum, the apparatus comprising:
a processor configured to:
transmit a random access channel (RACH) preamble in a physical random access channel (PRACH);
decode a random access response (RAR) message from a base station;
transmit a message that includes an identification of the UE; and
decode a grant of uplink resources from the base station,
wherein, the RACH preamble is configured for one level of coverage enhancement (CE), wherein:
when Physical Downlink Shared Channel (PDSCH) is not part of an RAR window, then an RAR window length is determined as a sum of a maximum listen before talk (LBT) size, a Machine Type Communication Physical Downlink Control Channel (MPDCCH) length, and a multiple dwell time; or
when PDSCH is part of the RAR window, then the RAR window length is determined as a sum of the maximum LBT size, a downlink (DL) transmission time depending on Downlink/Uplink (DL/UL) configuration, and the multiple dwell time; and a radio frequency (RF) interface to receive the RACH preamble and the message that includes the identification of the UE.

2. The apparatus of claim 1, wherein the processor is to process one level of a common search space (CSS) Physical Downlink Control Channel (PDCCH) to determine a Downlink Control Information (DCI) corresponding to the RAR message and to configure one level of Physical Uplink Control Channel (PUCCH) or Physical Uplink Shared Channel (PUSCH).

3. The apparatus of claim 2, wherein one level of a CSS PDCCH configuration includes one level of Aggregation level, one level of Repetition level and one level of blind decoding attempt, and a UE search space timing is reset every dwell time.

4. The apparatus of claim 1, wherein the RACH preamble is configured for two levels of CE: CE level 0 and CE level 1, and a PRACH length of the two levels of CE are configured in Orthogonal Frequency-Division Multiplexing (OFDM) symbols, and different level RACHs are orthogonal by code-division multiplexing (CDM) or time-division multiplexing (TDM) or frequency-division multiplexing (FDM).

5. The apparatus of claim 4, wherein the processor is to process two levels of CSS PDCCH to determine Downlink Control Information (DCI) corresponding to the RAR message, and to configure two levels of PUCCH or PUSCH.

6. The apparatus of claim 1, wherein a legacy RAR grant is reused with one or more of the following exceptions:
Msg3 PUSCH narrowband index bit field is removed; and
Msg3/4 MPDCCH narrowband index bit field is removed.

7. The apparatus of claim 6, wherein Uplink (UL) delay bit field is removed.

8. The apparatus of claim 6, wherein a Channel State Information (CSI) request is reinterpreted to indicate whether the CSI is wideband or performed over a frequency band over which a DCI is transmitted.

9. The apparatus of claim 1, wherein a RAR window starts at a start of a subsequent downlink (DL) duration and a TRACH configuration is at least three subframes before a uplink (UL) duration ending time.

10. The apparatus of claim 1, wherein a RAR window starts at a subframe which is at least three subframes after a last subframe that contains a preamble transmission, with a RAR window length being ra-ResponseWindowSize subframes.

11. The apparatus of claim 1, wherein if an RAR window starts from at least three subframes after the transmission of the RACH preamble, a RAR window length is configured using an absolute subframe time index.

12. The apparatus of claim 1, wherein if the RACH preamble is one subframe, and six PRB Zadoff-Chu sequences, a Rand©m Access-Radio Network Temporary identity (RA-RNTI) is calculated by the following equation:

$$RA\text{-}RNTI = 1 + t\_id + 10 * f\_id + 60 * (SFN\_id \bmod (W\max/10)),$$

where t_id is a subframe index of associated with the transmission of the RACH preamble transmission (where 0<=t_id<10), Wmax is a maximum RAR window, and SFN_id is an index of a radio frame carrying the transmission of RACH preamble.

13. The apparatus of claim 1, wherein a value for ra-ResponseWindowSize is calculated based on number of Machine Type Communication Physical Downlink Control Channel (MPDCCH) repetitions, clear channel assessment (CCA) window, and whether a Physical Downlink Shared Channel (PDSCH) is included in a RAR window size.

14. The apparatus of claim 1, wherein,
if the RACH preamble is one subframe, and one PRB Zadoff-Chu sequence, RA-RNTI is calculated by the following equation:

$$RA\text{-}RNTI = 1 + t\_id + 10 * f\_id + 60 * (SFN\_id \bmod (W\max/10)),$$

where t_id is a subframe index of the transmission of the RACH preamble (where OK=t_id<10), f_id is a frequency index of the transmission of the RACH preamble, with 0<=f_id<6, Wmax is a maximum RAR window length, and SFN_id is an index of a radio frame carrying the transmission of the RACH preamble; and
if the RACH preamble is one slot, and one PRIG Zadoff-Chu sequence, the RA-RNTI is calculated by the following equation:

$$RA\text{-}RNTI = 1 + t\_id + 20 * f\_id + 120 * (SFN\_id \bmod (W\max/10)),$$

where t_id is a slot index of the transmission of the RACH preamble (where 0<=t_id<20), f_id is the frequency index of the transmission of the RACH preamble, with 0<=f_id<6, Wmax is the maximum RAR window length, and SFN_id is the index of the radio frame carrying the transmission of the RACH preamble.

15. An apparatus of a base station operable to communicate with an enhanced Machine-Type Communication (eMTC) user equipment (UE) in an unlicensed spectrum, comprising:
a processor configured to:
decode a random access channel (RACH) preamble to be included in physical random access channel (PRACH) data from the UE; and
encode a random access response (RAR) in response to the RACH preamble, wherein the RACH preamble is configured for one level of coverage enhancement (CE), wherein a value for ra-ResponseWindowSize is calculated based on a number of Machine Type Communication Physical Downlink Control Channel (MPDCCH) repetitions, clear channel assessment (CCA) window, and whether a Physical Downlink Shared Channel (PDSCH) is included in a RAR window size; and
a radio frequency (RF) interface to receive the RAR.

16. The apparatus of claim 15, wherein a legacy RAR grant is reused with one or more following exceptions:
Msg3 PUSCH narrowband index bit field is removed; and
Msg3/4 MPDCCH narrowband index bit field is removed.

17. The apparatus of claim 16, wherein an Uplink (UL) delay bit field is removed.

18. The apparatus of claim 16, wherein Msg3 PUSCH Resource allocation is extended to 5 bits.

19. The apparatus of claim 16, wherein, a Channel State Information (CSI) request is reinterpreted to indicate whether the CSI is wideband or performed over a frequency band over which a DCI is transmitted.

20. The apparatus of claim 16, wherein, a Channel State Information (CSI) request is reused, the CSI including one or more of a channel quality indication (CCI), a preceding matrix indication (PMI) or a rank indication (RI), and a polling bit is added in the CSI request to indicate whether the CCI, PMI or RI is wideband or corresponds to a frequency at which DCI is transmitted.

21. The apparatus of claim 16, wherein, a Channel State Information (CSI) request bit is not added, and the base station performs a channel estimation based on the RAM according to channel reciprocity.

22. The apparatus of claim 15, wherein:
when Physical Downlink Shared Channel (PDSCH) is not part of an RAR window, then an RAR window length is determined as a sum of a maximum listen before talk (LBT) size, a Machine Type Communication Physical Downlink Control Channel (MPDCCH) length, and a multiple dwell time; or
when PDSCH is part of the RAR window, then the RAR window length is determined as a sum of the maximum LBT size, a downlink (DL) transmission time depending on Downlink/Uplink (DL/UL) configuration, and the multiple dwell time.

* * * * *